United States Patent [19]

Moribe

[11] Patent Number: 5,285,436
[45] Date of Patent: Feb. 8, 1994

[54] METHOD OF AVOIDING MEDIUM DEFECTS IN RECORD/REPRODUCE APPARATUS

[75] Inventor: Yoshihiro Moribe, Chigasaki, Japan

[73] Assignee: Hitachi, Ltd., Tokyo, Japan

[21] Appl. No.: 905,103

[22] Filed: Jun. 26, 1992

[30] Foreign Application Priority Data

Jun. 27, 1991 [JP] Japan ................. 3-157172

[51] Int. Cl.$^5$ ............................................. G11B 27/36
[52] U.S. Cl. ........................................ 369/58; 369/54; 369/35; 360/75; 360/53
[58] Field of Search ................ 369/36, 54, 58, 59; 360/53, 75, 39, 31, 86, 25, 98.01, 98.02; 371/10.2, 10.1; 395/425

[56] References Cited

U.S. PATENT DOCUMENTS

| | | | |
|---|---|---|---|
| 4,611,314 | 9/1986 | Ogata et al. | 371/10.2 X |
| 4,631,723 | 12/1986 | Rathbun et al. | 371/10.2 |
| 5,075,804 | 12/1991 | Deyring | 360/53 X |
| 5,084,789 | 1/1992 | Kamo et al. | 360/53 |
| 5,088,081 | 2/1992 | Farr | 369/54 |

FOREIGN PATENT DOCUMENTS 1-315071 12/1989 Japan .

*Primary Examiner*—Aristotelis Psitos
*Assistant Examiner*—Duncan Wilkinson
*Attorney, Agent, or Firm*—Kenyon & Kenyon

[57] ABSTRACT

In a record/reproduce apparatus, medium defects in magnetic disks are avoided without considerably losing record areas. In a record or reproduce mode, the plurality of magnetic disks are accessed in parallel by a plurality of magnetic heads and a plurality of record circuits or reproduce circuits. Regarding the record areas where only one of the magnetic disks has the medium defect, a control circuit controls a head change-over circuit so that a record area in a spare magnetic disk may be accessed by a spare magnetic head instead of the defective record area. Besides, regarding the record areas where two or more of the magnetic disks have the medium defects, the control circuit operates so that spare record areas in the two or more magnetic disks may be accessed instead of the defective record areas.

12 Claims, 14 Drawing Sheets

METHOD OF AVOIDING MEDIUM DEFECTS IN RECORD/REPRODUCE APPARATUS

BACKGROUND OF THE INVENTION

1. Field of the Invention

The present invention relates to a record/reproduce apparatus, and more particularly to a record/reproduce method which can avoid the defective parts of storage media in record/reproduce operations.

2. Description of the Related Art

Record/reproduce apparatuses include a magnetic disk device, an optical disk device, an optomagnetic disk device, etc. The record media of such record/reproduce apparatuses sometimes contain parts unsuitable for record/reproduce, in other words, medium defects on account of impurities on the record surfaces, etc.

Therefore, a record/reproduce apparatus in the prior art performs a process in which substitutive parts prepared beforehand are used instead of the defective parts.

Such a technique is known from the disclosure of Japanese Patent Application Laid-open No. 315071/1989.

With this technique, one disk surface is reserved as a spare in advance, and sectors on the spare disk surface are substituted for sectors having medium defects on the main disk.

Meanwhile, as information processing has developed highly in recent years, a higher operating speed and a higher reliability are required also of the record/reproduce apparatuses.

In some cases, therefore, a method wherein the k record surfaces of a plurality of record media are accessed in parallel so as to write or read data is adopted. In this specification, such a method shall be termed the "parallel record/reproduce technique".

According to the parallel record/reproduce technique, a plurality of record circuits and reproduce circuits are included in a record/reproduce apparatus, and a plurality of record surfaces are simultaneously accessed by a plurality of magnetic heads so as to write or read data in parallel.

With the record/reproduce apparatus adopting the parallel record/reproduce technique, accordingly, when data composed of a plurality of bits is divided into bit units so as to write or read the resulting bits into or from the plurality of record surfaces, the speed of access to the data can be increased. On the other hand, when the same data is simultaneously written into the plurality of record surfaces in duplicative fashion, recorded data can be multiplexed, and hence, the reliability of the recording can be enhanced.

SUMMARY OF THE INVENTION

It is therefore an object of the present invention to provide, in a record/reproduce apparatus adopting the parallel record/reproduce technique, a record/reproduce method which can favorably avoid defective medium parts without considerably losing record areas.

In order to accomplish the object, the present invention relates to a record/reproduce apparatus comprising a plurality of disk type record media, rotation device for rotating the plurality of disk type record media in synchronism with one another, and a plurality of heads which are respectively disposed in correspondence with record surfaces of the plurality of disk type record media and which are simultaneously accessible to the record surfaces, wherein the record surfaces of the plurality of disk type record media include k (being a natural number) ordinary record surfaces and n (being a natural number) spare record surfaces to be substituted for the k ordinary record surfaces, each of the record surfaces has a plurality of record areas which are respectively specified by predetermined area Nos., and the same area No. is assigned to those record areas of the record surfaces which can be simultaneously accessed in parallel by the plurality of heads, the record/reproduce apparatus including selection device, record/reproduce device, and control device for appointing k record surfaces for either of record and reproduce modes to the selection device and for appointing an area No. of the record areas for the either mode in the k appointed record surfaces to the record/reproduce device, the selection device connecting the record/reproduce device with k heads which correspond respectively to the k record surfaces appointed by the control device, the record/reproduce device operating in the record mode to write data into those k record areas of the k record surfaces which have the area No. appointed by the control device, in parallel by the use of the k heads connected thereto, and operating in the reproduce mode to read data from those k record areas of the k record surfaces which have the area No. appointed by the control device, in parallel by the use of the k heads connected thereto, the control device operating in either mode to judge the area No. of the record areas to-be-accessed, record areas having medium defects among those k record areas to-be-accessed of the k ordinary record surfaces which have the area No., and the number of the defective record areas, whereupon on condition that none of the k record areas is defective, the control device appoints the k ordinary record surfaces to the selection device, and it appoints the judged area No. to the record/reproduce device, on condition that m (being a natural number which satisfies $m > n$) record areas among the k record areas are defective, the control device appoints the k ordinary record surfaces to the selection device, and it alters the record areas to-be-accessed and then appoints an area No. of the new record areas after the alteration to the record/reproduce device, and on condition that j (being a natural number which satisfies $j \leq n$) record areas among the k record areas are defective, the control device appoints the nondefective ordinary record areas and j record areas from among the n spare record areas to the selection device, and it appoints the judged area No. to the record/reproduce device.

According to the record/reproduce apparatus of the present invention adopting the parallel record/reproduce technique, in a case where the record surface of any of the plurality of record media has a defective record area, the spare record area is substituted for the defective record area. Thus, the other record areas to be accessed simultaneously with the defective record area can be effectively utilized without being disused.

DETAILED DESCRIPTION OF THE PREFERRED EMBODIMENTS

Now, an embodiment of a record/reproduce apparatus according to the present invention will be described by taking an application to a magnetic disk device as an example.

Figure 10:
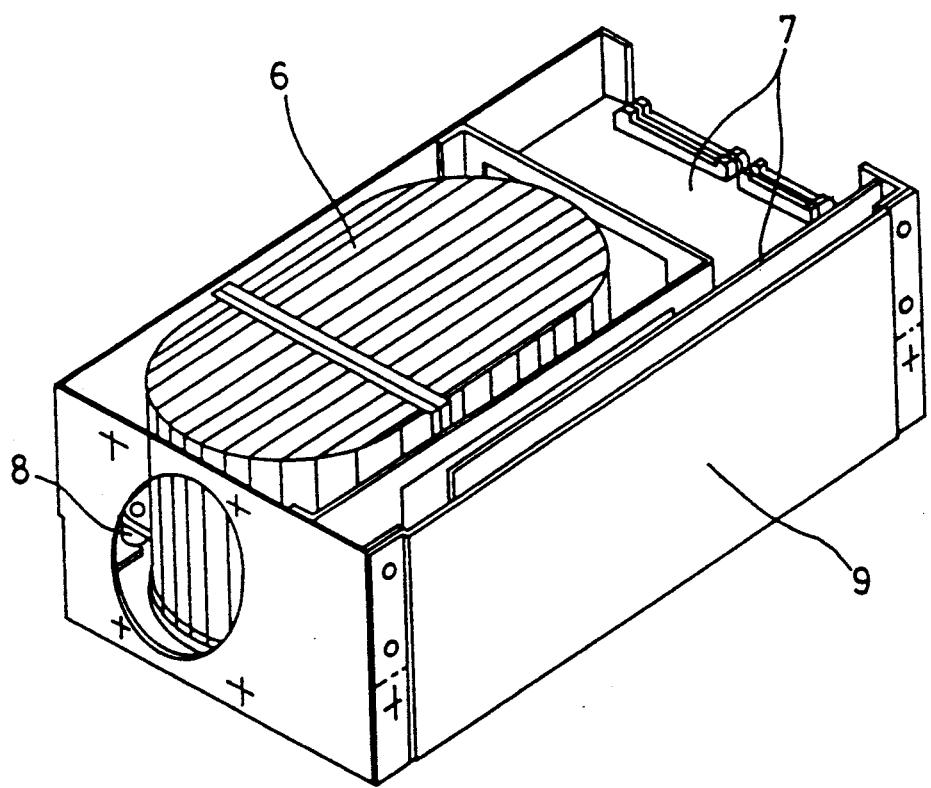
FIG. 10 is a perspective view showing the external appearance of the magnetic disk device.

First, FIG. 10 illustrates the structure of the record/reproduce apparatus in this embodiment.

As shown in the figure, the magnetic disk device of this embodiment includes a head and disk assembly (hereinbelow, abbreviated to "HDA") 6, a circuit board 7 on which an electronic circuit for governing the operations of the magnetic disk device is mounted, a shock absorber 8 which protects the HDA 6 from impacts, and a frame 9 which holds the HDA 6 through the shock absorber 8.

Figure 11:
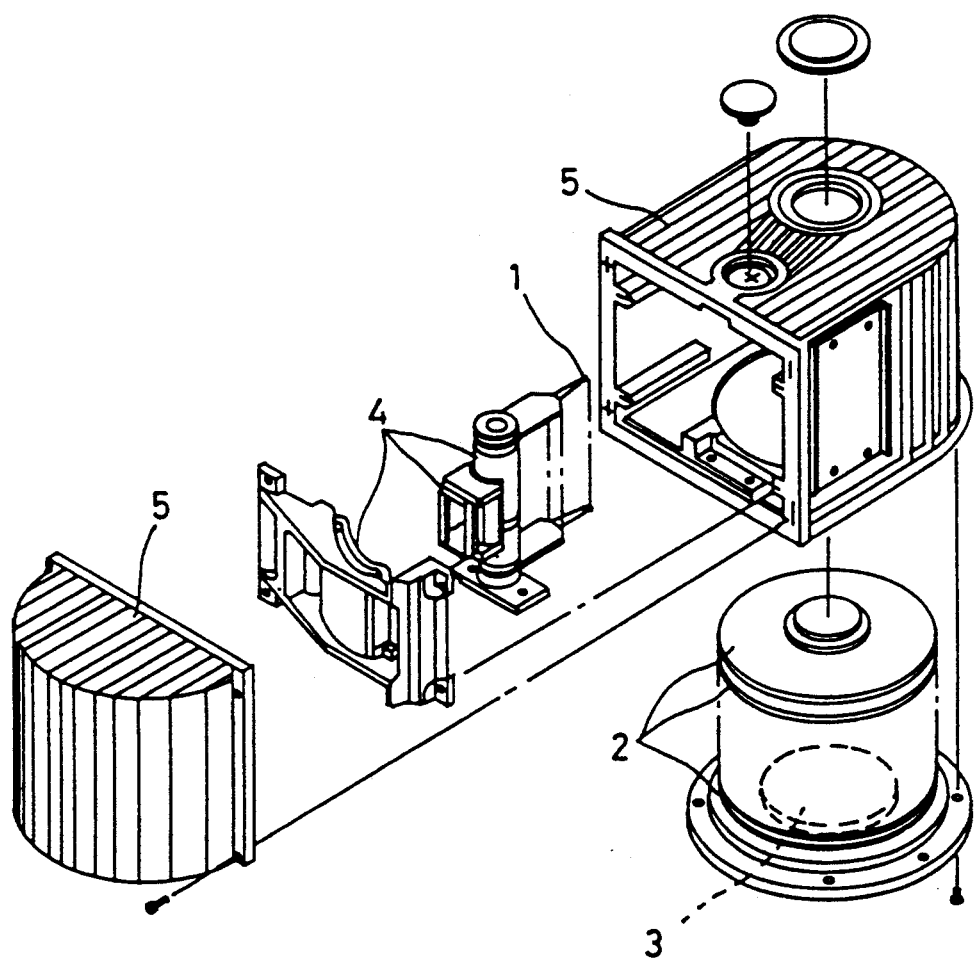
FIG. 11 is an exploded perspective view showing the internal structure of the magnetic disk device.

Next, the internal structure of the HDA 6 is illustrated in FIG. 11.

As shown in the figure, the HDA 6 includes a plurality of transducers for recording and playing back information (hereinbelow, termed the "magnetic heads") 1, disks 2 which are record media corresponding respectively to the magnetic heads 1, a spindle motor 3 which rotates the disks 2 coaxially stacked on top of one another, an actuator 4 which moves the magnetic heads 1 radially across the disks 2, and a housing 5 which seals all the constituents 1-4.

The circuit board 7 has the magnetic heads 1 and a host system (21 in FIG. 1) connected thereto.

Figure 1:
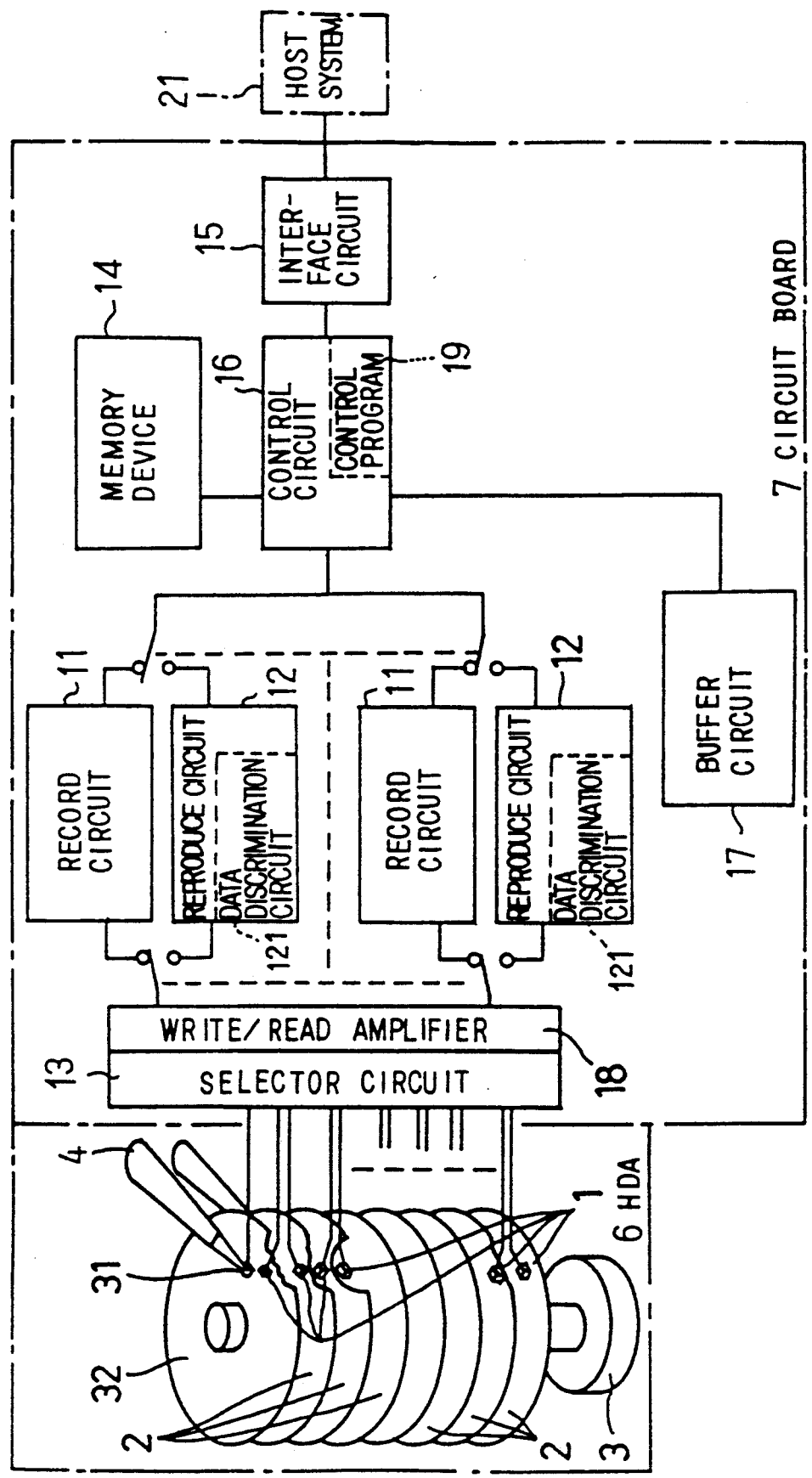
FIG. 1 is a block diagram showing the arrangement of an electronic circuit in a magnetic disk device according to an embodiment of the present invention.

The arrangement of the electronic circuit mounted on the circuit board 7 is illustrated in FIG. 1.

As shown in the figure, the circuit board 7 is equipped with a plurality of record circuits 11, a plurality of reproduce circuits 12, a selector circuit 13 and a write/read amplifier 18.

The selector circuit 13 is a circuit which selects the magnetic heads 1 for record/reproduce operations, and which is interposed between the record circuits 11 and the reproduce circuits 12.

Meanwhile, the magnetic disk device according to this embodiment further comprises a spare magnetic head 31 which is used for substitutive record surface, and the record surface of a spare disk 32 which corresponds to the spare magnetic head 31. In this embodiment, only one surface of the uppermost surface is provided for the substitutive record surface. If necessary, however, a plurality of record surfaces may well be provided for the substitutive record surface.

The selector circuit 13 has the function of changing-over any of the magnetic heads 1 to the spare magnetic head 31 in order to perform the record/reproduce operation. In addition, the write/read amplifier 18 amplitudes read signal from the magnetic heads 1.

The circuit board 7 is also equipped with memory device 14 for storing the defective medium parts of the disks 2, an interface circuit 15, a control circuit 16 for controlling the operations of the magnetic disk device, and a buffer circuit 17. The control circuit 16 includes a microprocessor and a control program 19.

The interface circuit 15 is a circuit by which reproduce information items from the reproduce circuits 12 are transferred to the host system 21, and by which record information items from the host system 21 are transferred to the record circuits 11. Besides, the buffer circuit 17 is a circuit in which the reproduce information items from the magnetic heads 1 or the record information items from the host system 21 are temporarily stored.

By the way, in order to precisely perform the record/reproduce operations, the write/read amplifier 18 is sometimes installed in the HDA 6 (refer to FIG. 10) together with the selector circuit 13.

Figure 2:
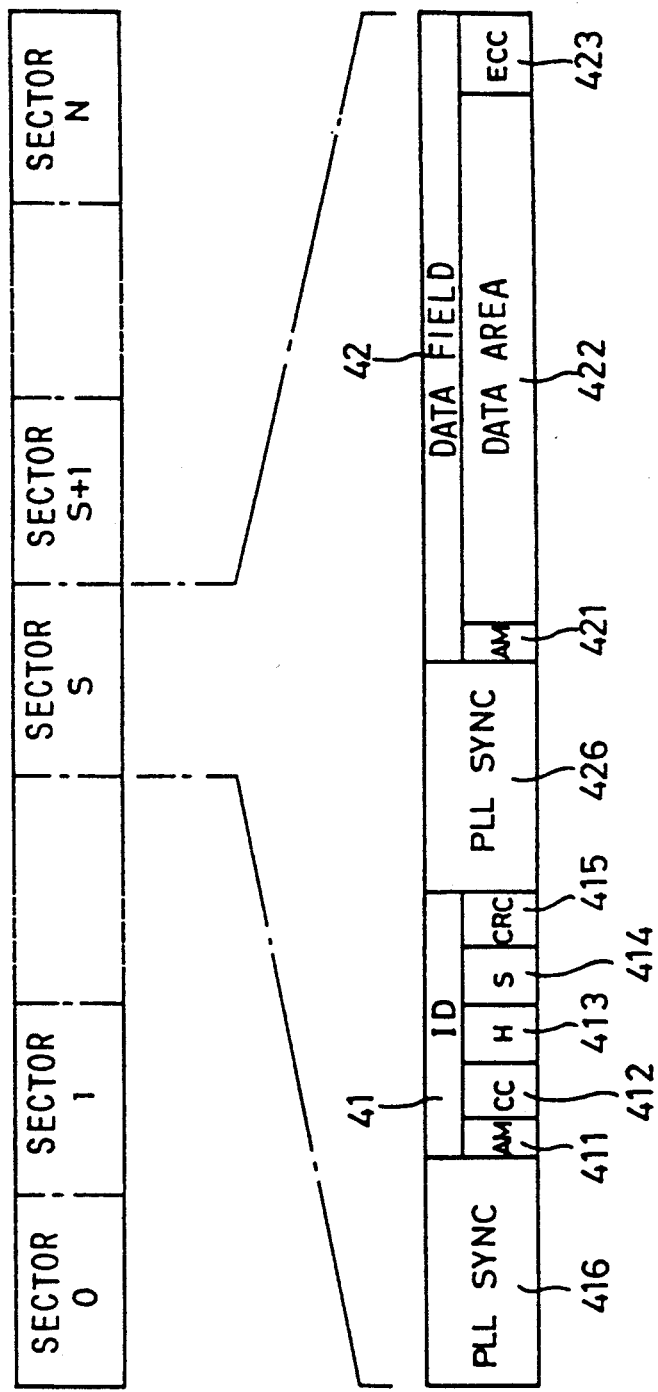
FIG. 2 is an explanatory diagram showing the record format of the magnetic disk device.

Next, the record format of the magnetic disks is illustrated in FIG. 2.

Shown in FIG. 2 is a track of cylinder No. "CC" and head No. "H".

As depicted in the upper portion of the figure, each track includes N sectors. The details of the sector No. "S" are as shown in the lower portion of the figure.

More specifically, each sector includes an ID (identification data) 41, a data field 42, and signal patterns "PLL SYNC" 416 and 426 which are respectively formed at the heads of the ID 41 and the data field 42. The signal patterns "PLL SYNC" are used for synchronizing the data discrimination circuit 121 of the reproduce circuit 12 with recorded data as will be stated later.

In addition, the ID 41 contains an address mark "AM" 411 indicating the head of record/reproduce information, and a CRC (cyclic redundancy check code) 415 for deciding if the record/reproduce information has been correctly played back. On the other hand, the data field 42 contains an address mark "AM" 421, and an ECC (error correction code) 423 for correcting record/reproduce information when the erroneous reproduce thereof has been detected.

Stored in the ID 41 is identification data which is a physical address indicating the location of the magnetic disk surface. That is, the ID 41 contains the No. of the magnetic head 1 or 31 (hereinbelow, termed "head No.") as denoted by "H" 413, the cylinder No. "CC" 412 which indicates the radial position of the disk 2 or 32, and the sector No. "S" 414 which indicates the circumferential position of the disk 2 or 32.

In the record or reproduce mode, the magnetic disk device writes or reads the information into or from the data area 422 of the data field 42 while reading the identification data items to confirm the location.

Such formatting is usually executed immediately after the assembly of the magnetic disk device.

After the formatting, a so-called "certify" operation is executed for checking if the record media of the disks 2 have defective parts. This operation is carried out in such a way that a defect detecting signal is written into each disk 2, and that the presence of an error in a read signal or the amplitude and phase variation of the read signal is/are checked. On this occasion, mark data indicating a sector ("bad sector") which includes the part of a medium defect detected in the disk 2, or the location information of the bad sector, is written into the disk 2.

Now, the record/reproduce operations of the magnetic disk device according to this embodiment will be described.

The magnetic disk device of this embodiment performs the record/reproduce operations in accordance with the parallel record/reproduce technique. More specifically, the control device 16 controls the selector circuit 13 so as to select two or more of the magnetic heads 1 for the record/reproduce operations. The selection is effected as follows by way of example: Information items of 8 bits are transferred in parallel, and the bits are respectively allotted to the magnetic heads 1. Subsequently, the selected magnetic heads 1 are connected with the plurality of record circuits 11 or reproduce circuits 12, and data items are recorded on or played back from two or more of the record surfaces in parallel.

Figure 3:
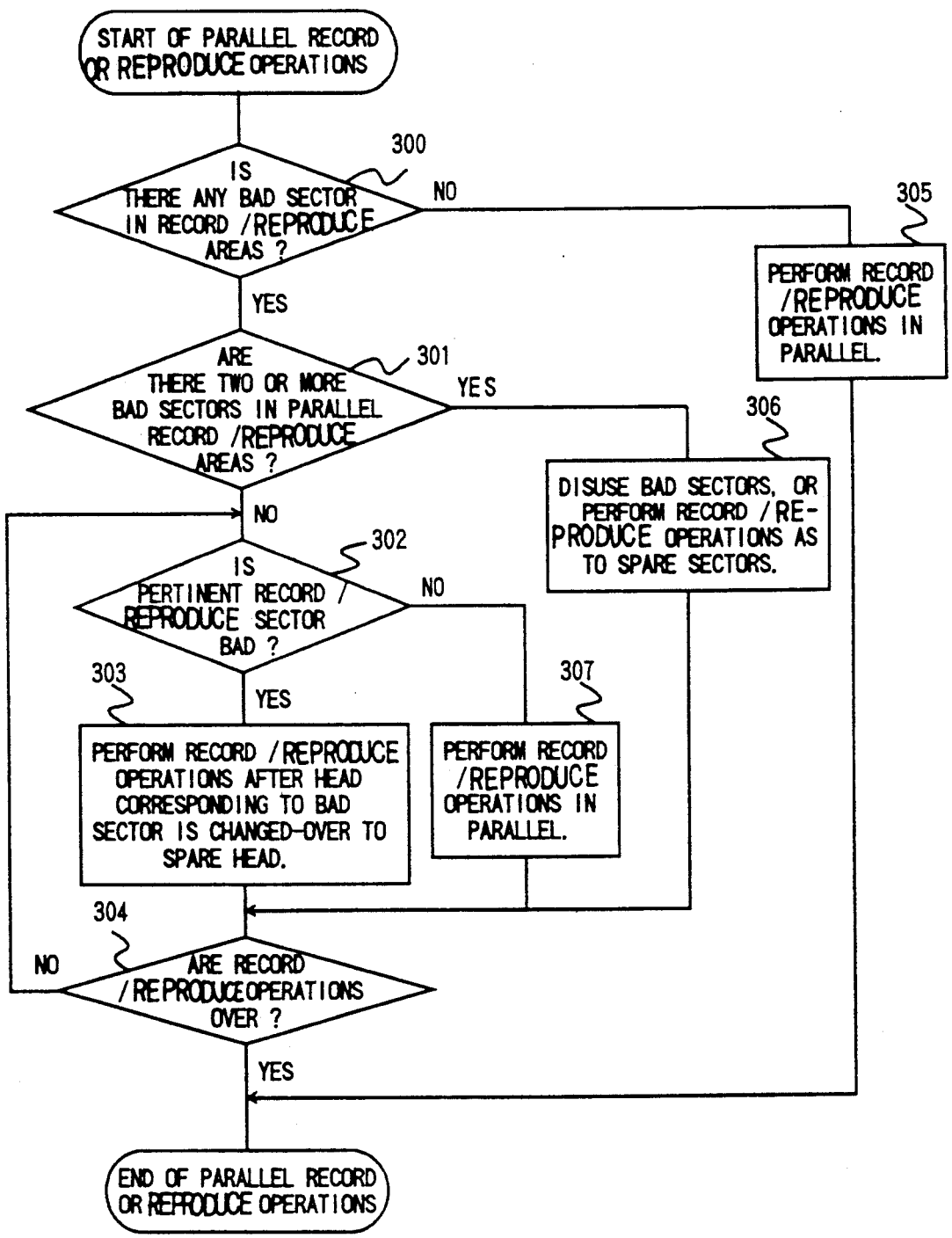
FIG. 3 is a flow chart showing the processing steps of the record/reproduce mode of the magnetic disk device.

FIG. 3 illustrates the steps of the record/reproduce operations of the magnetic disk device in this embodiment.

As seen from the figure, the record/reproduce operations are classified into the following three cases in conformity with the information items on the bad sectors written into the disks 2 beforehand:

CASE-1

When the record/reproduce areas have no sector unsuitable for record/reproduce, the record/reproduce operations are performed in parallel by the two or more selected magnetic heads 1 (steps 300, 305).

CASE-2

When two or more of the plurality of sectors to be accessed in parallel by the magnetic heads 1 are bad, the bad sectors are disused, and the record/reproduce operations are performed using the succeeding sectors or predetermined spare sectors (steps 301, 306).

CASE-3

When only one of the plurality of sectors to be accessed in parallel by the magnetic heads 1 is bad, the magnetic head 1 to access the pertinent bad sector among the magnetic heads 1 for the record/reproduce operations is changed-over to the spare magnetic head 31 upon arrival at the pertinent bad sector, and all the record/reproduce operations are performed also using the sector of the record surface of the spare disk 32 as a substitute for the bad sector (steps 302, 303). When no bad sector is found, the parallel record/reproduce operations are continued (steps 305, 307).

A step 304 decides if all the record/reproduce areas have been processed.

Next, the timings of the record/reproduce operations in the above cases will be described with reference to FIG. 4.

Figure 4:
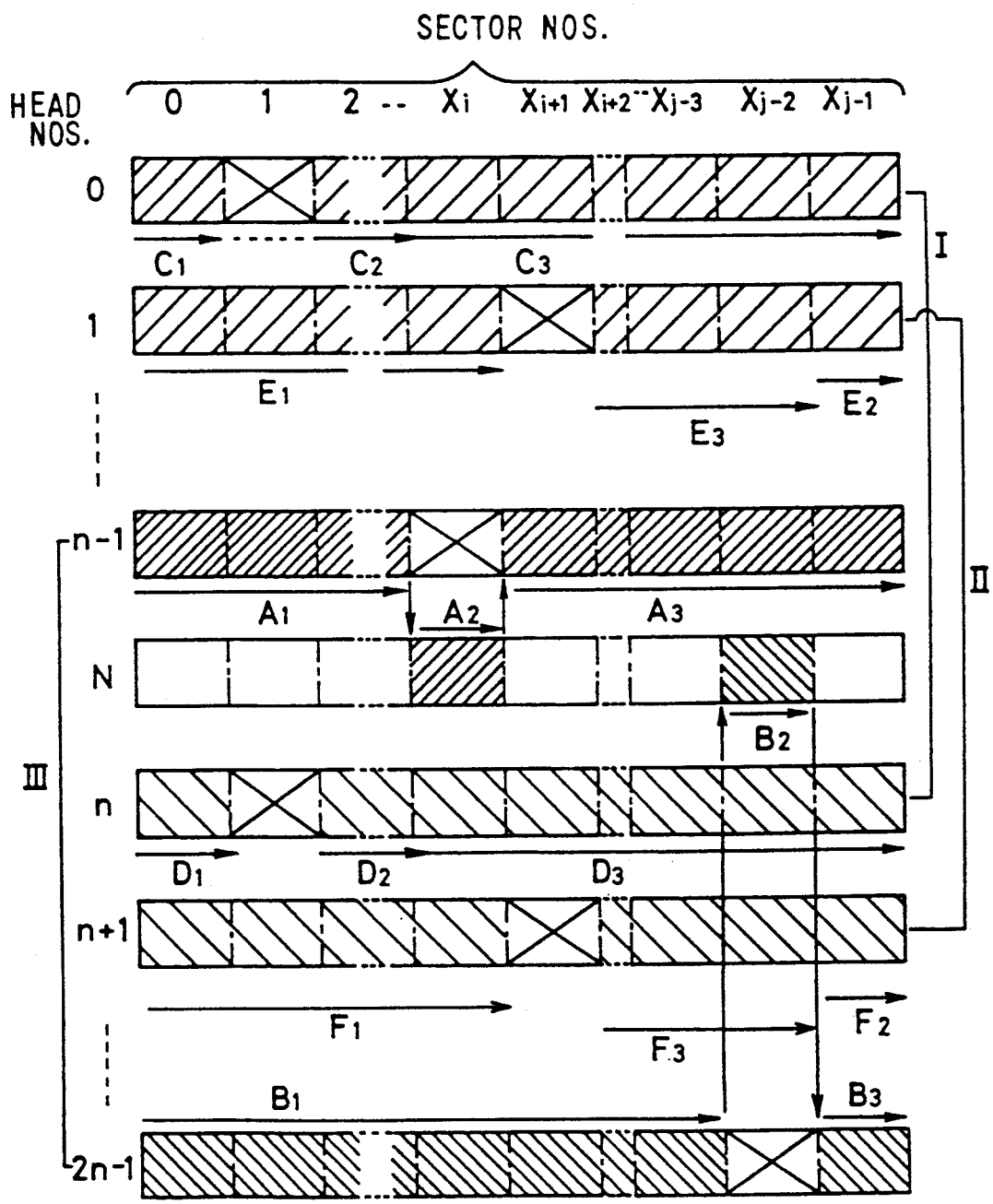
FIG. 4 is an explanatory diagram showing the record/reproduce steps of the magnetic disk device.

FIG. 4 illustrates an example in which the number of the magnetic heads 1 is assumed 2n. Referring to the figure, the 2n magnetic heads 1 to which head Nos. $0-(2n-1)$ are assigned are arranged so as to be capable of writing or reading information items in parallel. The single spare magnetic head 31 to which head No. N is assigned is disposed in addition to the 2n magnetic heads 1. The spare magnetic head 31 is used for writing data into or reading data from the substitutive sector when the sector to be accessed by any one of the 2n magnetic heads 1 is defective.

First, let's consider a situation (I in FIG. 4) in which data items are written into or read into from the record surfaces designated by the head Nos. 0 and n, in parallel.

It is now supposed as depicted in the figure that, regarding the tracks of the same cylinder No. CC, the track of the magnetic head No. 0 has a bad sector No. 1, while the track of the magnetic head No. n also has a bad sector No. 1.

In this situation, neither of the sectors No. 0 in the two record surfaces is a bad sector, and so are suitable for record/reproduce. As indicated by arrows C1 and D1 in the figure, therefore, the record/reproduce operations are simultaneously performed for the record surfaces designated by the head Nos. 0 and n. This aspect corresponds to Case-1 mentioned above.

In contrast, both the sectors No. 1 in the two record surfaces are bad sectors which are unsuitable for the record/reproduce operations. Therefore, the control device (16 in FIG. 1) having recognized this condition controls the relevant components so as to perform the record/reproduce operations in parallel by the use of the succeeding sectors No. 2 substituted for the bad sectors No. 1 as indicated by arrows C2 and D2. This aspect corresponds to Case-2 where the plurality of bad sectors are disused and where the succeeding sectors are used. The illustrated sectors Nos. Xi, et seq. in the two record surfaces have no sector unsuitable for the record/reproduce operations. As indicated by arrows C3 and D3 in the figure, therefore, the record/reproduce operations are performed in parallel for the record surfaces designated by the head Nos. 0 and n.

Next, let's consider a situation (II in FIG. 4) in which data items are written into or read from the record surfaces designated by the head Nos. 1 and (n+1), in parallel.

It is now supposed as depicted in the figure that, regarding the tracks of the same cylinder No. CC, the track of the magnetic head No. 1 has a bad sector No. Xi+1, while the track of the magnetic head No. (n+1) also has a bad sector No. Xi+1. Besides, it is supposed that sectors No. Xj−1 in the two record surfaces are spare sectors for substitutive record.

In this situation, none of the sector Nos. 0−Xi in the two record surfaces are sectors unsuitable for record/reproduce. As indicated by arrows E1 and F1 in the figure, therefore, the record/reproduce operations are performed in parallel for the record surfaces designated by the head Nos. 1 and (n+1).

In contrast, both the sectors No. Xi+1 in the two record surfaces are bad sectors which are unsuitable for the record/reproduce operations. Therefore, the control device (16 in FIG. 1) having recognized this condition seeks the spare sectors No. Xj−1. Then, the record/reproduce operations are performed in parallel for the spare sectors No. Xj−1 substituted for the bad sectors No. Xi+1 as indicated by arrows E2 and F2 in the figure. This aspect corresponds to the aforementioned case-2 where the plurality of bad sectors are disused and where the spare sectors are used.

The illustrated sector Nos. $Xi+2$, et seq. in the two record surfaces have no sectors unsuitable for the record/reproduce operations. As indicated by arrows E3 and F3 in the figure, therefore, the record/reproduce operations are performed in parallel for the record surfaces designated by the head Nos. 1 and $(n+1)$.

Next, let's consider a situation (III in FIG. 4) in which data items are written into or read from the record surfaces designated by the head Nos. $(n-1)$ and $(2n-1)$, in parallel.

It is now supposed as depicted in the figure that, regarding the tracks of the same cylinder No. CC, the track of the magnetic head No. $(n-1)$ has a bad sector of sector No. $Xi$, while the track of the magnetic head No. $(2n-1)$ has a bad sector No. $Xj$-2.

None of the sector Nos. 0–2 in the record surface corresponding to the magnetic head No. $(n-1)$ or the sector Nos. 0–$Xj$-3 in the record surface corresponding to the magnetic head No. $(2n-1)$ are sectors unsuitable for record/reproduce. Therefore, the record/reproduce operations proceed in parallel along arrows A1 and B1 indicated in the figure.

Meanwhile, the track of the magnetic head No. $(n-1)$ has the bad sector of the sector No. $Xi$, whereas the sector No. $Xi$ corresponding to the magnetic head No. $(2n-1)$ is not bad. In this condition, as regards the sector No. $Xi$ of the head No. $(n-1)$, the record/reproduce operation is performed using the spare magnetic head 31 of head No. N instead of the magnetic head No. $(n-1)$. This aspect corresponds to Case-3 stated before. Accordingly, the record/reproduce operation proceeds on the head No. N as indicated by an arrow A2. The record/reproduce of the track at head No. $(n-1)$ is resumed at the sector No. $Xi+1$ again, and is performed along an arrow A3.

Further, the track of the magnetic head of the head No. $(2n-1)$ for performing the record/reproduce operation in parallel with the above record/reproduce operation has the bad sector No. $Xj$-2, whereas the sector No. $Xj$-2 at the head No. $(n-1)$ is not bad. This aspect corresponds to Case-3, too. Therefore, as regards the sector of the sector No. $Xj$-2 in the track at head No. $(2n-1)$, the record/reproduce operation is performed using the spare magnetic head 31 of the head No. N instead of the magnetic head No. $(2n-1)$. Accordingly, the record/reproduce operation proceeds on the track at head No. N as indicated by an arrow B2. The record/reproduce of the track at head No. $(2n-1)$ is resumed at the sector No. $Xj$-1 again, and is performed along an arrow B3.

Owing to the above operations, the parallel record/reproduce operations of the two tracks of the different disks are completed.

As stated above concerning the individual cases, on condition that the sectors to be accessed in parallel by the plurality of magnetic heads 1 do not include the plurality of bad sectors, the record/reproduce operations are performed by changing-over the magnetic head 1 to the spare magnetic head 31 as the occasion arises. In this condition, accordingly, the record/reproduce operations can be carried out continuously without a break.

Incidentally, for the brevity of elucidation, the above description of the record/reproduce operations has referred to the example wherein the single spare magnetic head 31 is provided and wherein the two magnetic heads 1 write or read information items in parallel. It is also allowed, however, to dispose a plurality of sets each of which consists of the spare magnetic head 31 and the record surface of the spare disk corresponding thereto. By way of example, in a case where the spare magnetic heads 31 and the record surfaces of the spare disks are disposed in two sets, up to two of the magnetic heads 1 can be changed-over to the spare magnetic heads 31. Therefore, up to two of the sectors to be accessed in parallel by the plurality of magnetic heads 1 may well be bad sectors for attaining the continuous record/reproduce operations.

As thus far described, the parallel operations are performed in accordance with the presence or absence of the bad sector(s). As stated before, the bad sector is detected in the way that the mark data indicating the presence of the bad sector in the disk 2 is written in advance and is read in the record/reproduce mode. Alternatively, the detection is effected in the way that the location information of the bad sector is stored in the disk 2 beforehand and is referred to in the record/reproduce mode.

Now, the two expedients for detecting the bad sector will be described in detail.

First, the expedient in which the location information of the bad sector is stored in the disk 2 beforehand is explained below.

Figures 5A, 5B:
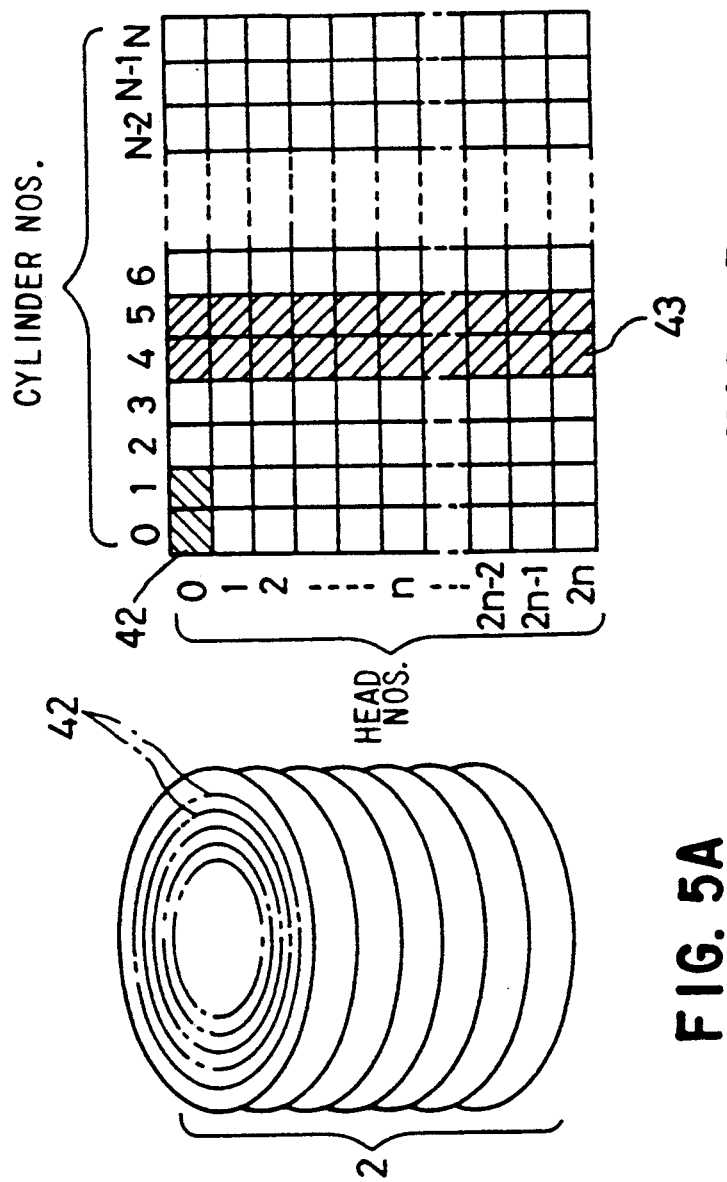
FIGS. 5A and 5B are explanatory diagrams showing the first storage scheme for medium-defect position information in the magnetic disk device.

According to this expedient, after the certify operation stated before, the cylinder Nos. "CC", head No. "H" and sector Nos. "S" of the bad sectors are written into the predetermined record areas 42 of each disk 2 as illustrated in FIG. 5A. These information items are read out on initiation of the magnetic disk device, and are stored in the memory device 14.

Then, when a record/reproduce instruction is received from the host system 21, the presence or absence of a bad sector (bad sectors) 41 in record/reproduce areas (43 in FIG. 5B) for the record/reproduce operations is decided by referring to the memory device 14. Depending upon the decided bad sector(s) 41, the predetermined record/reproduce operations are performed in accordance with the individual cases stated before.

Next, there will be described the first scheme of the expedient in which the mark data indicating the presence of the bad sector is written.

Figure 6:
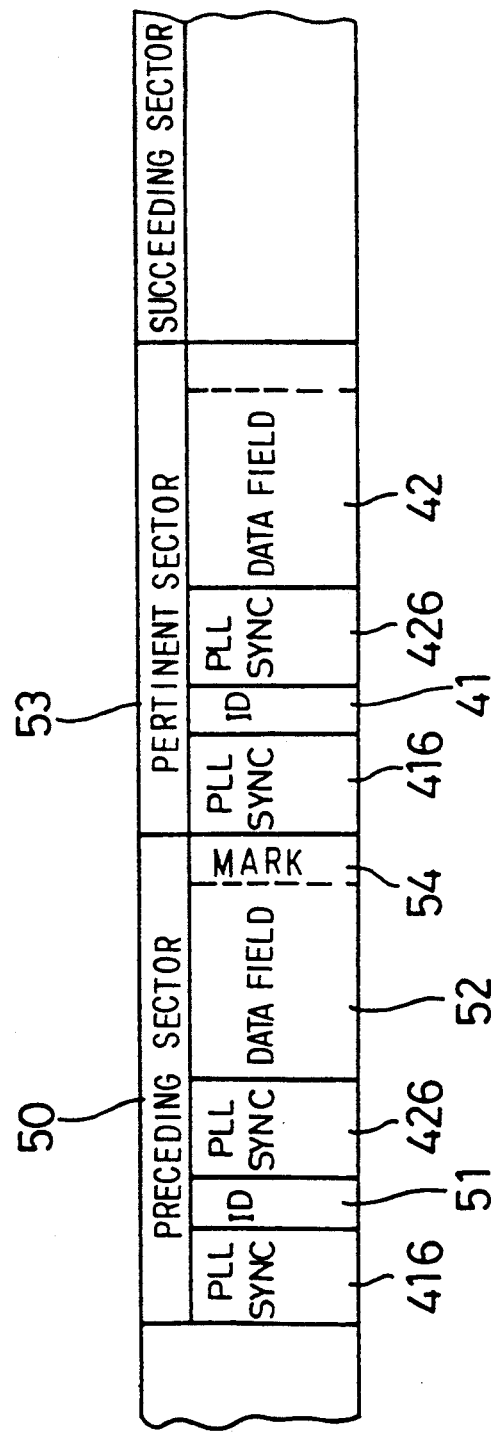
FIG. 6 is an explanatory diagram showing the second storage scheme for the medium-defect position information in the magnetic disk device.

With this scheme, as illustrated in FIG. 6, the mark data 54 to the effect that the next sector 53 is defective is written into the ID part 51 of a sector 50 preceding the bad sector 53 or in the part of the preceding sector 50 posterior to the data field 52 thereof. In the record/reproduce mode, the mark data 54 is read, whereupon the control circuit 16 recognizes the location of the bad sector 53 and controls the selector circuit 13 so as to change-over the corresponding magnetic head 1 to the spare magnetic head 31.

Incidentally, although the mark data 54 is arranged in the sector 50 directly before the bad sector 53 in the illustration of FIG. 6, it may well be arranged in a sector preceding the bad sector 53 by a plurality of sectors.

Next, there will be described the second scheme of the expedient in which the mark data indicating the presence of the bad sector is written.

Figure 7:
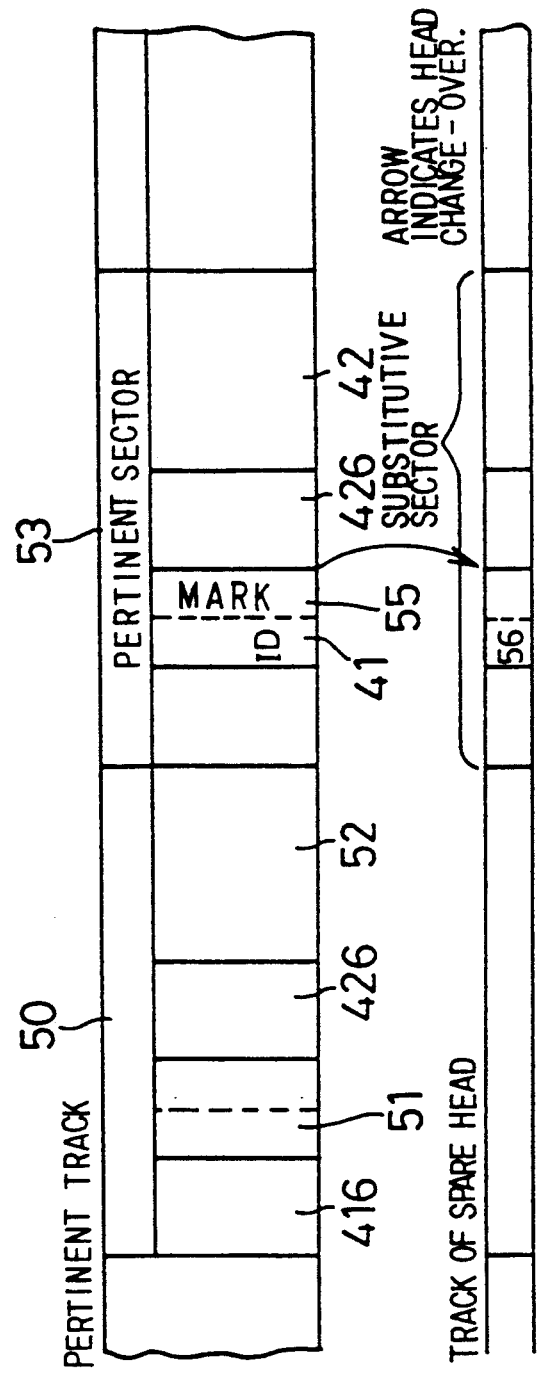
FIG. 7 is an explanatory diagram showing the third storage scheme for the medium-defect position information in the magnetic disk device.

According to this scheme, as illustrated in FIG. 7, the mark data 55 to the effect that the pertinent sector 53 is defective is written in the ID part 41 of the bad sector 53. In the record/reproduce mode, the mark data 55 is read, whereupon the control circuit 16 recognizes the location of the bad sector 53 and controls the selector circuit 13 so as to effect the change-over to the spare magnetic head 31.

Now, the operation of changing-over the magnetic heads in the record/reproduce mode will be described in detail.

Figure 8:
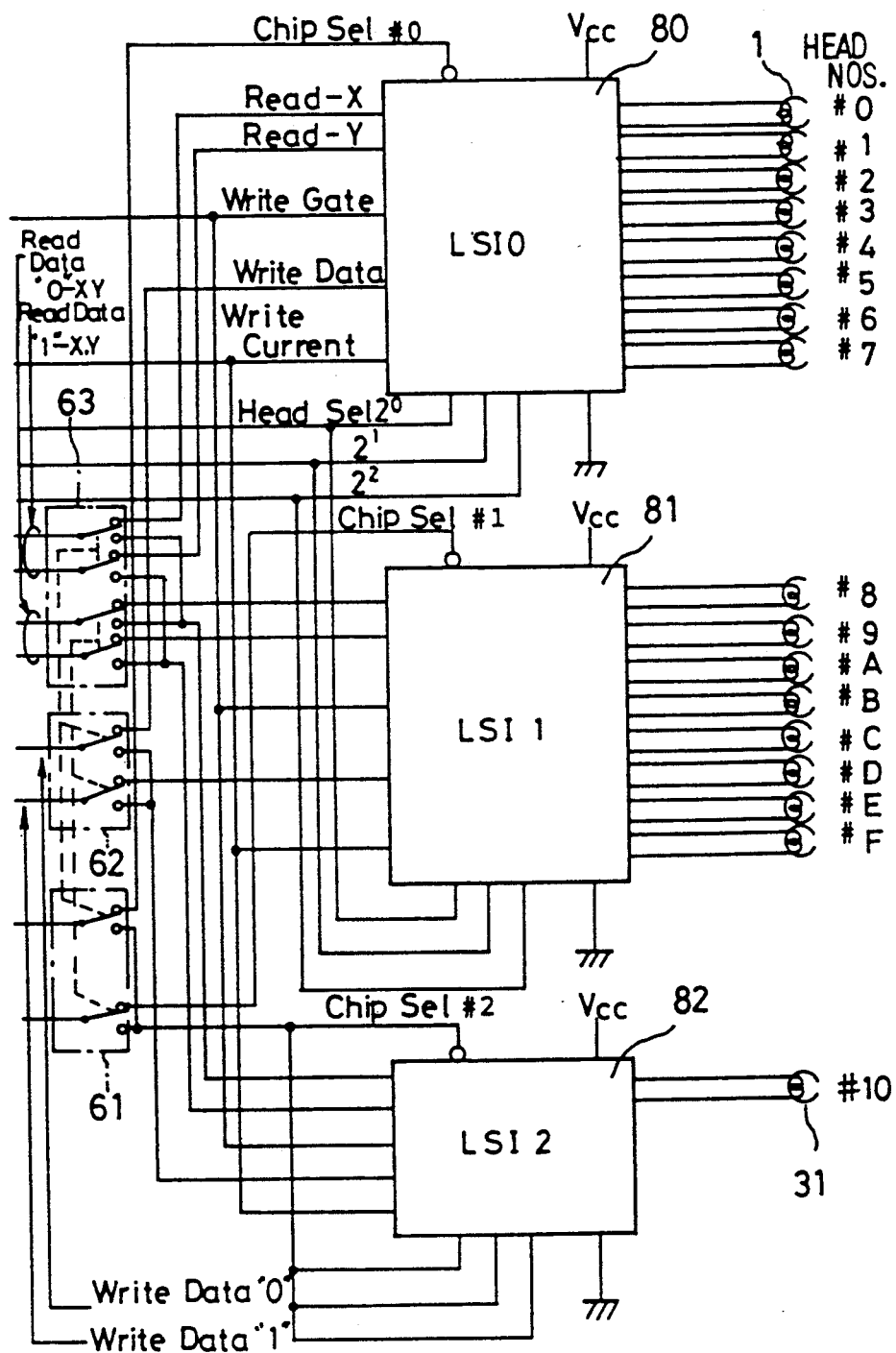
FIG. 8 is a block diagram showing the arrangement of a selector circuit in the magnetic disk device.

First, the detailed arrangement of the selector circuit 13 is illustrated in FIG. 8.

As shown in the figure, the selector circuit 13 is connected to a plurality of magnetic heads 1 (head Nos. "#0"-"#7" and "#8"-"#F") for performing the record or reproduce operations in parallel, and the spare magnetic head 31 (head No. "#10").

In addition, the selector circuit 13 includes LSI's 80, 81 and 82, and LSI selection circuit 61, a write data change-over circuit 62, and a read data change-over circuit 63.

Each of the LSI's 80 and 81 has a circuit for selecting the magnetic head 1 for the record/reproduce, a write amplifier, and a first-stage read amplifier built therein.

Connected to the LSI's 80 and 81 are a power source line (Vcc), head selection lines (Head Sel $2^0-2^2$), LSI selection lines (Chip Sel #0, #1), a write instruction line (Write Gate) [which serves as a read instruction line in its OFF status], parallel data lines for writing data (Write Data "0"-"1"), parallel data lines for reading differential outputs (Read Data "0"-"1"), and magnetic head connection lines (connection lines for head Nos. #0-#7 and those for head Nos. #8-#F).

The LSI 82 has a circuit for selecting the spare magnetic head 31 for the record/reproduce, a write amplifier, and a first-stage read amplifier built therein.

Connected to the LSI 82 are the power source line (Vcc), head selection lines (Head Sel $2^0-2^2$), an LSI selection line (Chip Sel #2), the write instruction line (Write Gate) [which serves as the read instruction line in its OFF status], parallel data lines for writing data (Write Data "0"-"1"), parallel data lines for reading differential outputs (Read Data "0"-"1"), and a spare magnetic head connection line (connection line for head No. #10).

A current line for writing data (Write Current) is connected to the LSI's 80, 81 and 82.

The magnetic disk device according to this embodiment comprises a plurality of LSI's in which circuits for selecting the magnetic heads for writing or reading information items in parallel through the record circuits 11 or reproduce circuits 12, write amplifiers and first-stage read amplifiers are provided in built-in fashion.

For the brevity of elucidation, however, this embodiment will be described as comprising the three LSI's 80, 81 and 82 in which the LSI 82 for the spare magnetic head is included.

The operation of the selector circuit 13 at the magnetic head change-over proceeds as stated below.

Figure 9:
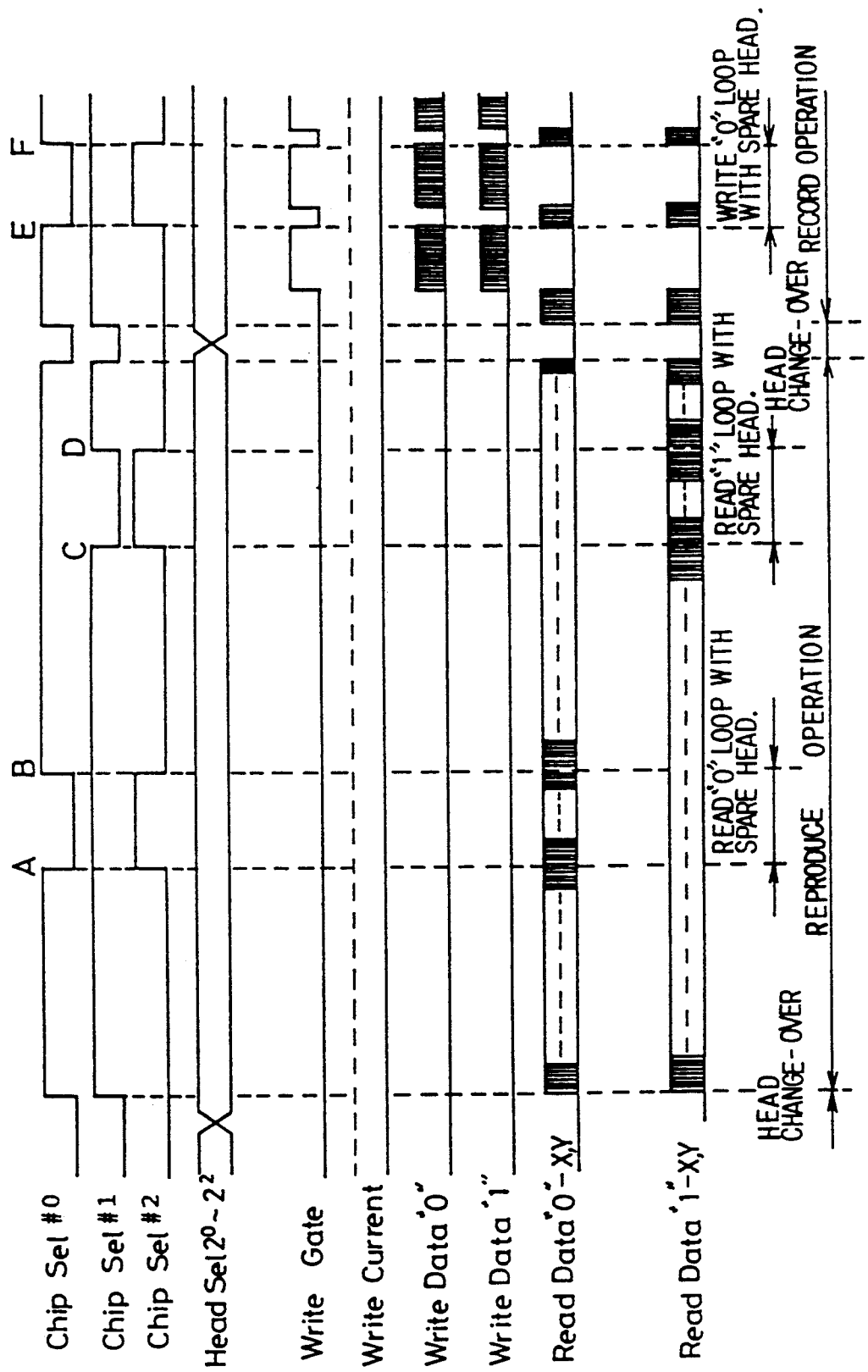
FIG. 9 is a timing chart showing the operation timings of the selector circuit of the magnetic disk device.

FIG. 9 illustrates the operation timings of the selector circuit 13.

As shown in the figure, in the ordinary operation, the LSI's 80 and 81 each being connected to the plurality of magnetic heads 1 are selected, and each of these LSI's selects one of the magnetic heads. Thus, the record operations are performed through the signal lines Write Gate and Write Current. Besides, the reproduce operations are performed by turning OFF the signal line Write Gate.

Meanwhile, the spare magnetic head 31 of the head No. #10 is connected to the LSI 82, and it functions as stated below.

When a bad sector has been detected by any of the schemes described before (indicated at A in FIG. 9), the LSI selection line Chip Sel #0 of the LSI 80 to which the magnetic head 1 to access the pertinent sector is connected is turned OFF, and the LSI selection line Chip Sel #2 of the LSI 82 is turned ON instead.

On this occasion, when the control of the magnetic head device is set so that the spare magnetic head 31 (head No. #10) connected to the LSI 82 may be selected by the turn-ON of the LSI selection line Chip Sel #2 of this LSI 82, the spare magnetic head 31 is used for the record/reproduce in lieu of the magnetic head 1 having been selected by the LSI 80.

Accordingly, the record/reproduce operations proceed in parallel without a break.

Likewise, in a case (C in FIG. 9) where a sector which the magnetic head 1 selected by the LSI 81 is to access is a bad sector, the line Chip Sel #1 is turned OFF, and the line Chip Sel #2 is turned ON, whereby the spare magnetic head #10 is used for the record/reproduce in lieu of the magnetic head 1 having been selected by the LSI 81.

As explained before, in a case where two sectors to be simultaneously accessed by the two magnetic heads 1 selected by the LSI's 80 and 81 are both bad sectors, the record/reproduce operations are performed by turning OFF both the lines Chip Sel #0 and #1 to skip the pertinent sectors or to move the heads 1 to other record areas.

Meanwhile, the selector circuit 13 shown in FIG. 8 may well be manufactured in the form of a single LSI.

In this case, a plurality of magnetic heads are divided into n groups and then connected to the single LSI. Any desired m groups are selected from among the n groups by group selection lines (equivalent to the LSI selection lines stated above), and m magnetic heads respectively belonging to the m groups and selected by head selection lines are connected to m sets of writing parallel data lines or reading parallel data lines in accordance with the ON or OFF status of a write instruction line.

Although the above embodiment has referred to the example in which the record/reproduce operation is performed by changing-over the magnetic head 1 to the spare head 31 in sector units, the record/reproduce operation may well be carried out using the spare magnetic head 31 in track units. In this case, however, it is conditioned that, among a plurality of tracks having an identical cylinder No. (the same radial positions on the disks), only one track has a medium defect.

In addition, although the above embodiment has been described as changing-over the magnetic heads with a single drive, magnetic heads may well be changed-over among a plurality of magnetic disk devices in a magnetic disk system, such as disk array, comprising the plurality of magnetic disk devices.

Now, such an embodiment will be described.

Figure 12:
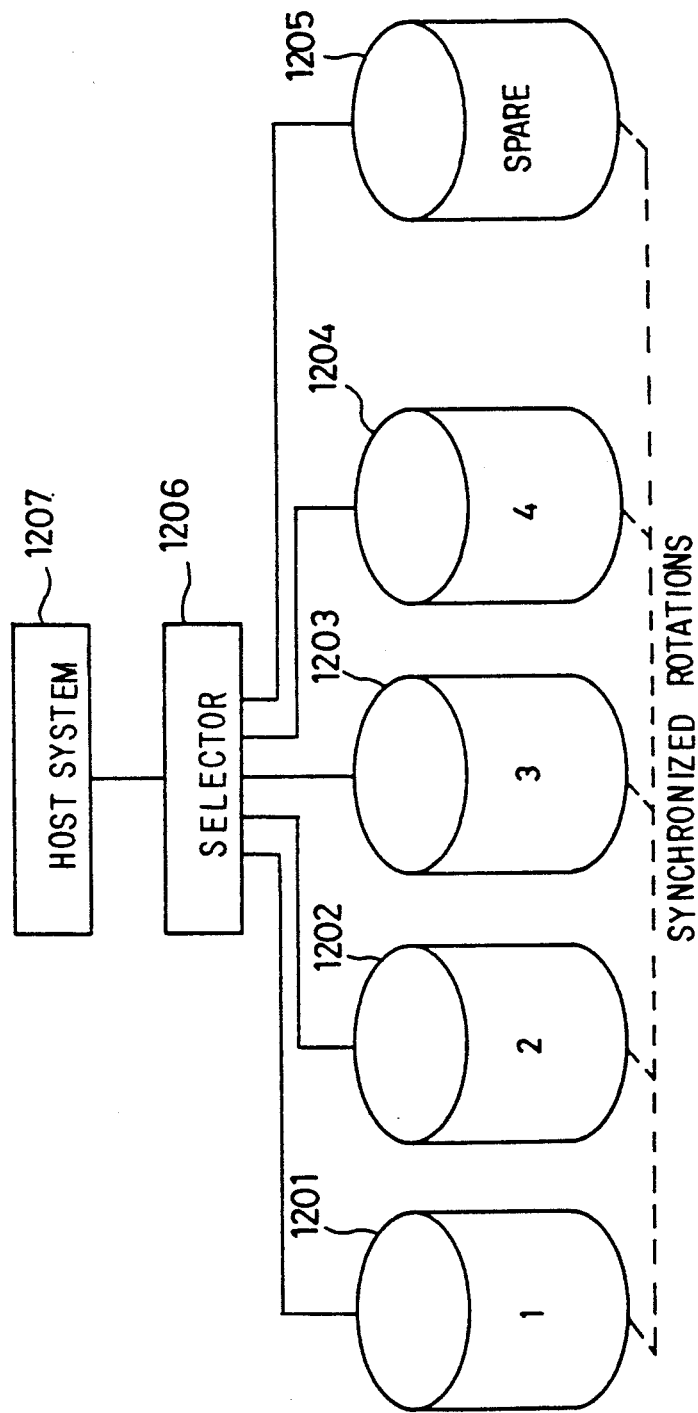
FIG. 12 is a block diagram showing the construction of a magnetic disk system according to another embodiment of the present invention.

FIG. 12 illustrates the construction of the magnetic disk system which is furnished with a plurality of drives.

Referring to the figure, numerals 1201~1204 indicate magnetic disk devices which are used for ordinary record/reproduce. Numeral 1205 indicates a magnetic disk device which is used for substitutive recording/reproduce.

Each of the magnetic disk devices in this magnetic disk system is constructionally different from the foregoing magnetic disk device shown in FIG. 1 in that the spare magnetic head 31 and the corresponding spare record surface 32 are not included.

Besides, each of the magnetic disk devices may be either one adopting the parallel record/reproduce technique or one not adopting it.

All the magnetic disk devices perform synchronized rotating operations. More specifically, all the magnetic disk devices are rotated in order that sectors having an identical cylinder No. and an identical sector No. may simultaneously come to the positions of the magnetic heads in the individual magnetic disk devices. Accordingly, data items to which the magnetic disk devices are accessible at any desired time are the data items of the sectors at the identical cylinder No. and the identical sector No.

Numeral 1206 in the figure indicates a selector. The selector 1206 selects the magnetic disk device(s) which is/are to be connected to a host system 1207.

This magnetic disk system operates as stated below.

In the first place, there will be described a case where the record/reproduce operations of the magnetic disk devices are sequentially carried out in the magnetic disk system.

Figure 13:
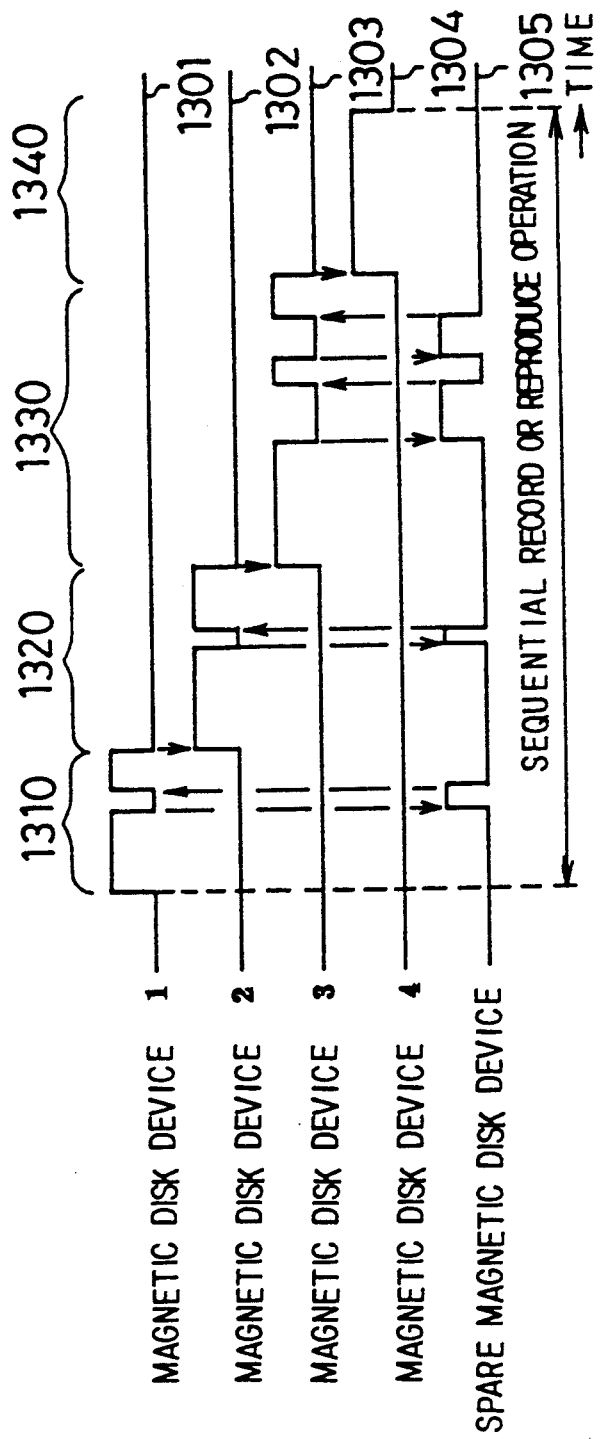
FIG. 13 is a timing chart showing the first operating example of the magnetic disk system.

Operation timings in this case are illustrated in FIG. 13.

Referring to the figure, a time period 1310 is the term during which the magnetic disk device 1201 is accessed subject to no medium defect, a time period 1320 is the term during which the magnetic disk device 1202 is accessed subject to no medium defect, a time period 1330 is the term during which the magnetic disk device 1203 is accessed subject to no medium defect, and a time period 1340 is the term during which the magnetic disk device 1204 is accessed subject to no medium defect. In addition, the periods of time during which signals 1301-1305 lie at a "high" level are the terms for which the magnetic disk devices corresponding to the respective signals are actually accessed.

By way of example, that part of the time period 1310 during which the signal 1301 lies at a "low" level indicates that a sector to be accessed has a medium defect in the magnetic disk device 1201. As depicted in the figure, in this example, the magnetic disk device 1205 provided as the spare is accessed instead of the magnetic disk device 1201 during the partial time period. Likewise, when sectors to be accessed have medium defects in the individual magnetic disk devices 1201-1204, the spare magnetic disk device 1205 is used as a substitute.

In this manner, the magnetic disk devices to be accessed are changed-over to the spare magnetic disk device at the parts of the record media having the medium defects, whereby the record/reproduce operations can be performed as if no medium defect existed.

Secondly, there will be described a case where the record/reproduce operations of the magnetic disk devices are carried out in parallel in the magnetic disk system.

Figure 14:
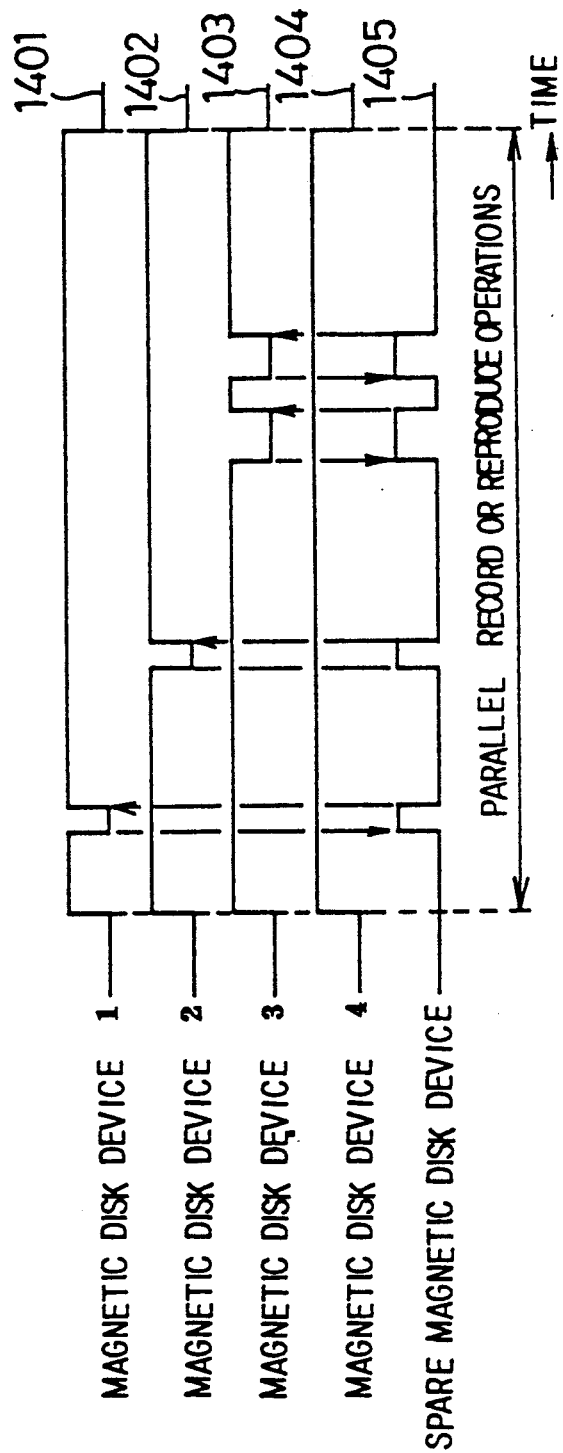
FIG. 14 is a timing chart showing the second operating example of the magnetic disk system.

Operation timings in this case are illustrated in FIG. 14.

Herein, the magnetic disk devices 1201-1204 are simultaneously accessed. Referring to the figure, the periods of time during which signals 1401-1405 lie at a "high" level are the terms for which the magnetic disk devices corresponding to the respective signals are actually accessed. As seen from the figure, all the magnetic disk devices 1201-1204 are accessed at the same time subject to no medium defect.

However, if any of the magnetic disk devices 1201~1204 has a defective part, the spare magnetic disk device 1205 is used. By way of example, the period of time during which the signal 1401 lies at a "low" level indicates that a sector to be accessed has a medium defect in the magnetic disk device 1201. As depicted in the figure, in this example, the magnetic disk device 1205 provided as the spare is accessed instead of the magnetic disk device 1201 during the time period. Likewise, when sectors to be accessed have medium defects in the individual magnetic disk devices 1201-1204, the spare magnetic disk device 1205 is used as substitute.

In this manner, the magnetic disk devices to be accessed are changed-over to the spare magnetic disk device at the parts of the record media having the medium defects, whereby the record/reproduce operations can be performed as if no medium defect existed.

Such change-over to the spare magnetic disk device 1205 is effected as follows:

First, the individual magnetic disk devices 1201-1205 report their own medium defect parts to the host system 1207 beforehand. Then, the host system 1207 stores the reported defective parts of the magnetic disk devices 1201-1205. In the actual record/reproduce operations, the host system 1207 controls the magnetic disk devices 1201-1205 and the selector 1206 in accordance with the stored defective parts of media and changes-over access destinations to the spare magnetic disk device 1205 at the defective parts of the media. In a case where two or more of the magnetic disk devices for ordinary record/reproduce have medium defects at the identical cylinder No. and identical sector No., the change-over to the spare magnetic disk device is not effected. On this occasion, the defective areas of the media are disused.

Alternatively, the change-over to the spare magnetic disk device 1205 may well be effected as follows:

The control circuit (16 in FIG. 1) of each of the magnetic disk devices 1201-1204 reports its own medium defect parts to the control circuit of the spare magnetic disk device 1205.

The control circuit 16 of the spare magnetic disk device 1205 controls the selector 1206 so as to connect its own device 1205 with the host system 1207 in lieu of any of the magnetic disk devices 1201-1204 for ordinary record/reproduce having the medium defect, at the defective part. However, in a case where two or more of the magnetic disk devices for the ordinary record/reproduce have medium defects at an identical cylinder No. and identical sector No., the change-over to the spare magnetic disk device is not effected. On this occasion, the control circuit 16 of the spare magnetic disk device 1205 informs those of the magnetic disk devices 1201-1204 so as to skip the defective parts of the media.

Although, in the above, the embodiment of the record/reproduce apparatus according to the present invention has been described by exemplifying the application to the magnetic disk device, the foregoing embodiment is similarly applicable to other record/reproduce apparatuses of rotating type, such as optical disk devices and optomagnetic disk devices.

As thus far described, according to the present invention, a record/reproduce apparatus and a record/reproduce method which can avoid medium defect parts favorably without considerably losing record areas can be provided in a record/reproduce apparatus which adopts the parallel record/reproduce technique.

What is claimed is:

1. A record and reproduce apparatus comprising a plurality of disk type record media, rotation means for rotating said plurality of disk type record media in synchronism with one another, and a plurality of heads which are respectively disposed in correspondence with record surfaces of said plurality of disk type record media and which are simultaneously accessible to said record surfaces, wherein said record surfaces of said plurality of disk type record media include k (being a natural number) ordinary record surfaces and n (being a natural number) spare record surfaces to be substituted for said k ordinary record surfaces, each of said record surfaces has a plurality of record areas which are respectively specified by predetermined area numbers and the same area number is assigned to each of those record areas of said record surfaces which can be simultaneously accessed in parallel by said plurality of heads;

said record and reproduce apparatus including selection means, record and reproduce means, and control means for appointing k record surfaces for either of record or reproduce modes to said selection means and for appointing an area number of the record areas for the either mode in said k appointed record surfaces to said record and reproduce means;

said selection means connecting said record and reproduce means with k heads which correspond respectively to said k record surfaces appointed by said control means;

said record and reproduce means operating in said record mode to write data into those k record areas of said k record surfaces which have said area number appointed by said control means, in parallel by the use of said k heads connected thereto, and operating in said reproduce mode to read data from those k record areas of said k record surfaces which have said area number appointed by said control means, in parallel by the use of said k heads connected said control means operating in said either mode to judge said area number of said record areas to-be-accessed, record areas having medium defects among those k record areas to-be-accessed of said k ordinary record surfaces which have said area number, and the number of the defective record areas;

whereupon on condition that none of said k record area is defective, said control means appoints said k ordinary record surfaces to said selection means, and it appoints the judged area number to said record and reproduce means;

on condition that m (being a natural number which satisfies m>n) record areas among said k record areas are defective, said control means appoints said k ordinary record surfaces to said selection means, and it alters said record areas to-be-accessed and then appoints area number of new record areas after the alteration to said record and reproduce means; and on condition that j (being a natural number which satisfies j≦n) record areas among said k record areas are defective, said control means appoints the nondefective ordinary record areas and j record areas among said n spare record areas to said selection means, and it appoints the judged area number to said record and reproduce means.

2. A record and reproduce apparatus as defined in claim 1, wherein said plurality of record areas of said each ordinary record surface include ordinary record areas to be used for said record and reproduce modes and spare record areas to be substituted for said ordinary record areas, and wherein on condition that said m (satisfying m>n) record areas of m ordinary record surfaces among said k record areas of said k ordinary record surfaces having the same area number are defective, said control means alters said record areas to-be-accessed to said spare record areas and then appoints area number of said spare record areas to said record and reproduce means.

3. A record and reproduce apparatus as defined in claim 1, wherein memory means is further comprised for storing information items on said defective record areas of said k ordinary record surfaces in relation to the area numbers thereof, and wherein in accordance with said information items stored said memory means, said control means judges the defective record areas among those k record areas to-be-accessed of said k ordinary record surfaces which have the same area number, and the number of said defective record areas.

4. A record and reproduce apparatus as defined in claim 2, wherein memory means if further comprised for storing information items on said defective record areas of said k ordinary record surfaces in relation to the area numbers thereof, and wherein in accordance with said information items stored in said memory means, said control means judges the defective record areas among those k record areas to-be-accessed of said k ordinary record surfaces which have the same area number, and the number of said defective record areas.

5. A record and reproduce apparatus as defined in claim 3, wherein said information items to be stored in said memory means are information items which have been stored in predetermined record areas of at least one of said record surfaces beforehand, and wherein upon initialization of said record and reproduce apparatus, said control means controls said record and reproduce means and said selection means so as to read said information items stored in said predetermined record areas of said disk type record media and then stores the read information items in said memory means.

6. A record and reproduce apparatus as defined in claim 4, wherein said information items to be stored in said memory means are information items which have been stored in predetermined record areas of at least one of said record surfaces beforehand, and wherein upon initialization of said record and reproduce apparatus, said control means control said record and reproduce means and said selection means so as to read said information items stored in said predetermined record areas of said disk type record media and then stores the read information items in said memory means.

7. A record and reproduce apparatus as defined in claim 1, wherein each of said k ordinary record surfaces stores marks indicative of defective record areas at locations which lie in predetermined relationships with said defective record areas, and wherein during either of said record and reproduce modes for said ordinary record surfaces, said control means reads said marks out of said ordinary record surfaces, and it judges from the locations of the read marks the defective record areas among those k record areas to-be-accessed of said k ordinary record surfaces which have the same area number as well as the number of said defective record areas.

8. A record and reproduce apparatus as defined in claim 2, wherein each of said k ordinary record surfaces stores marks indicative of defective record areas at locations which lie in predetermined relationship with said defective record areas, and wherein during said either of said record and reproduce modes for said ordinary record surfaces, said control means reads said marks out of said ordinary record surfaces, and it judges from the locations of the read marks the defective record areas among those k record areas to-be-accessed of said k ordinary record surfaces which have the same area number as well as the number of said defective record areas.

9. A record and reproduce system comprising at least three disk type recorders each of which employs disk type record media, and control means for controlling said at least three disk type recorders so as to operate in either of record and reproduce modes in parallel;

said at least three disk type recorders including k (being a natural number which satisfies $2 \leq k$) ordinary record and reproduce devices, and n (being a natural number which satisfies $k + n \geq 3$) spare record and reproduce devices to be substituted for said ordinary record and reproduce devices;

said control means operating in either mode to control said ordinary record and reproduce devices so as to access those record areas of said k ordinary record and reproduce devices which are accessible in parallel, on condition that none of said record areas accessible in parallel has a medium defect, and to control said ordinary record and reproduce devices and to spare record and reproduce devices so as to access record areas of the number j, (being a natural number which satisfies $j \leq n$) of said spare record and reproduce devices instead of the accessible record areas having medium defects, on condition that the j record areas among those record areas of said k ordinary record and reproduce devices which are accessible in parallel have said medium defects.

10. In a record and reproduce apparatus comprising a plurality of disk type record media, rotation means for rotating said plurality of disk type record media in synchronism with one another, and a plurality of heads which are respectively disposed in correspondence with record surfaces of said plurality of disk type record media and which are simultaneously accessible to said record surfaces;

a method of avoiding medium defects, comprising the steps of:

dividing said record surfaces of said plurality of disk type record media into k (being a natural number) ordinary record surfaces and n (being a natural number) spare record surfaces to be substituted for said k ordinary record surfaces;

assigning areas numbers to said record areas of said respective record surfaces so that those record areas of said plurality of record which can be simultaneously accessed in parallel by said plurality of heads may be specified by the same area number;

judging said area number of said record areas to-be-accessed, record areas having medium defects among those k record areas to-be-accessed of said k ordinary record surfaces which have said area number, and the number of the defective record areas;

actuating said k heads corresponding respectively to said ordinary record surfaces on condition that none of said k record areas is defective, so as to perform either of writing data in parallel into those record areas of said k ordinary record surfaces which have the judged area number, and reading data in parallel from those record areas of said k ordinary record surfaces which have the judged area number;

actuating said k heads corresponding respectively to said ordinary record surfaces on condition that m (being a natural number which satisfies $m > n$) record areas among said k record areas are defective, so as to perform either of writing data in parallel to those k record areas of said k ordinary record surfaces which have an area number different from that of the defective record areas, and reading data in parallel from those k record areas of said k ordinary record surfaces which have the different area number; and actuating the corresponding k heads on condition that j (being a natural number which satisfies $j \leq n$) records areas among said k record areas are defective, so as to perform either of writing data in parallel into the nondefective record areas of the (k−j) ordinary record surfaces and those record areas of j ones of said n spare record surfaces which have the judged area number, and reading data in parallel from the nondefective record areas of the (k−j) ordinary record surfaces and those record areas of j ones of said n spare record surfaces which have the judged area number.

11. A medium defect avoiding method in a record and reproduce apparatus as defined in claim 10, comprising the steps of:

dividing the plurality of record areas of said each ordinary record surface into ordinary record areas to be used for record and reproduce modes and spare record areas to be substituted for said ordinary record areas; and actuating said k heads corresponding respectively to said ordinary record surfaces on condition that said m (satisfying $m > n$) record areas of m ordinary record surfaces among said k record areas of said k ordinary record surfaces having the same area number are defective, so as to perform either of writing data in parallel into the k spare record areas of said k ordinary record surfaces, and reading data in parallel from the k spare record areas of said k ordinary record surfaces.

12. In a record and reproduce system having at least three disk type recorders each of which employs disk type record media, and control means for controlling said at least three disk type records so as to operate in either of record and reproduce modes in parallel;

a method of avoiding medium defects, comprising the steps of:

dividing said at least three disk type recorders into k (being a natural number which satisfies $2 \leq k$) ordinary record and reproduce devices, and n (being a natural number which satisfies $k + n \geq 3$) spare record and reproduce devices to be substituted for said ordinary record and reproduce devices;

operating said control means in either of said record and reproduce modes so as to access those record areas of said k ordinary record and reproduce devices which are accessible in parallel, on condition that none of said record areas accessible in parallel has a medium defect; and operating said control means so as to access record areas of j (being a natural number which satisfies $j \leq n$) ones of said spare record and reproduce devices instead of the accessible record areas having medium defects, on condition that the j record areas among those record areas of k ordinary record and reproduce devices which are accessible in parallel have said medium defects.

* * * * *

UNITED STATES PATENT AND TRADEMARK OFFICE
CERTIFICATE OF CORRECTION

PATENT NO. : 5,285,436
DATED : February 8, 1994
INVENTOR(S) : Yoshihiro Moribe

It is certified that error appears in the above-indentified patent and that said Letters Patent is hereby corrected as shown below:

| Column | Line | |
|--------|------|---|
| 13 | 35 | After "connected" insert --thereto;--. |
| 14 | 66 | Change "relationship" to --relationships--. |

Signed and Sealed this

Ninth Day of August, 1994

Attest:

BRUCE LEHMAN

Attesting Officer

Commissioner of Patents and Trademarks